United States Patent
Kim et al.

(10) Patent No.: US 10,449,948 B2
(45) Date of Patent: Oct. 22, 2019

(54) SYSTEM AND METHOD FOR CONTROLLING TORQUE INTERVENTION OF HYBRID ELECTRIC VEHICLE

(71) Applicant: Hyundai Motor Company, Seoul (KR)

(72) Inventors: Do Hee Kim, Gyeonggi-do (KR); Teh Hwan Cho, Gyeonggi-do (KR); Sung Deok Kim, Gyeonggi-do (KR); Gwang Il Du, Incheon (KR); Joon Young Park, Seoul (KR); Jee Wook Huh, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 46 days.

(21) Appl. No.: 15/348,384

(22) Filed: Nov. 10, 2016

(65) Prior Publication Data

US 2017/0137018 A1 May 18, 2017

(30) Foreign Application Priority Data

Nov. 12, 2015 (KR) .................. 10-2015-0158907

(51) Int. Cl.
*B60W 10/06* (2006.01)
*B60W 10/08* (2006.01)
(Continued)

(52) U.S. Cl.
CPC ............ *B60W 20/15* (2016.01); *B60W 10/06* (2013.01); *B60W 10/08* (2013.01);
(Continued)

(58) Field of Classification Search
CPC ...... B60W 20/15; B60W 10/06; B60W 10/08; B60W 30/18172; B60W 30/19; B60W 2540/12; B60W 2710/083; Y10S 903/93
(Continued)

(56) References Cited

U.S. PATENT DOCUMENTS 6,095,945 A * 8/2000 Graf ..................... B60K 28/165
477/110
8,172,018 B2 * 5/2012 Suzuki .................... B60L 50/16
180/65.285

(Continued)

FOREIGN PATENT DOCUMENTS

JP 2015-089186 5/2015
KR 10-2014-0005545 A 1/2014
(Continued)

*Primary Examiner* — Krishnan Ramesh
(74) *Attorney, Agent, or Firm* — Mintz Levin Cohn Ferris Glovsky and Popeo, P.C.; Peter F. Corless

(57) ABSTRACT

A method of controlling torque intervention of a hybrid electric vehicle includes: receiving at least one torque intervention request; determining, by a control unit, a gear shift intervention requested quantity requested for limiting a driving torque of the vehicle during a gear shift and a brake intervention requested quantity requested for limiting the driving torque of the vehicle during a braking operation in response to receiving the at least one torque intervention request; generating, by the control unit, a combined intervention requested quantity based on the gear shift intervention requested quantity and the brake intervention requested quantity; and determining, by the control unit, a type of current intervention based on the combined intervention requested quantity in real time.

24 Claims, 2 Drawing Sheets

(51) Int. Cl.
*B60W 20/15* (2016.01)
*B60W 30/18* (2012.01)
*B60W 30/19* (2012.01)

(52) U.S. Cl.
CPC ...... *B60W 30/18172* (2013.01); *B60W 30/19* (2013.01); *B60W 2540/12* (2013.01); *B60W 2710/083* (2013.01); *B60W 2710/10* (2013.01); *Y10S 903/93* (2013.01)

(58) Field of Classification Search
USPC .......................................................... 701/22
See application file for complete search history.

(56) References Cited

U.S. PATENT DOCUMENTS

| | | | | |
|---|---|---|---|---|
| 8,430,791 | B2* | 4/2013 | Ito | B60K 6/445 |
| | | | | 477/5 |
| 8,509,980 | B2* | 8/2013 | Abe | B60K 6/48 |
| | | | | 701/22 |
| 8,528,676 | B2* | 9/2013 | Endo | B60W 10/10 |
| | | | | 180/65.285 |
| 9,365,204 | B2* | 6/2016 | Whitney | B60W 10/11 |
| 9,621,796 | B2* | 4/2017 | Muukki | H04N 5/23232 |
| 9,656,652 | B2* | 5/2017 | Oh | B60T 13/74 |
| 2009/0314565 | A1* | 12/2009 | Suzuki | B60K 6/365 |
| | | | | 180/65.285 |
| 2010/0102767 | A1* | 4/2010 | Endo | B60K 6/365 |
| | | | | 318/453 |
| 2011/0312468 | A1* | 12/2011 | Ito | B60K 6/365 |
| | | | | 477/15 |
| 2012/0185119 | A1* | 7/2012 | Abe | B60K 6/48 |
| | | | | 701/22 |
| 2015/0015736 | A1 | 1/2015 | Muukki et al. | |
| 2015/0094889 | A1* | 4/2015 | Oh | B60T 13/74 |
| | | | | 701/22 |
| 2015/0151736 | A1 | 6/2015 | Kim | |
| 2015/0166038 | A1* | 6/2015 | Whitney | B60W 10/11 |
| | | | | 701/54 |

FOREIGN PATENT DOCUMENTS

| | | |
|---|---|---|
| KR | 10-1490954 B1 | 2/2015 |
| KR | 10-1500245 | 3/2015 |
| KR | 10-1566755 | 11/2015 |

* cited by examiner

SYSTEM AND METHOD FOR CONTROLLING TORQUE INTERVENTION OF HYBRID ELECTRIC VEHICLE

CROSS-REFERENCE TO RELATED APPLICATION

This application claims under 35 U.S.C. § 119(a) the benefit of and priority to Korean Patent Application No. 10-2015-0158907 filed on Nov. 12, 2015, the entire contents of which are incorporated herein by reference as if fully set forth herein.

BACKGROUND (a) Technical Field

The present disclosure relates generally to a system and a method for controlling torque intervention, and more particularly, to a system and a method for controlling torque intervention of a hybrid electric vehicle for limiting driving force requested during the travelling of the vehicle.

(b) Background Art

As is generally known in the art, a hybrid electric vehicle is a vehicle equipped with a power train device and adopting an engine and a motor as power sources. The vehicle separately transmits power generated by the engine or the motor to a driving wheel or transmits power from both the engine and the motor to the driving wheel. Advantageously, the hybrid electric vehicle can decrease exhaust gas and improve fuel efficiency over conventional vehicles.

The power train device for the hybrid electric vehicle includes, for example, an engine clutch, which is arranged between the serially connected engine and motor to transmit or block power of the engine, and a transmission, which shifts and outputs the power of the motor or the power of the motor and the engine to the driving wheel. Meanwhile, the driving force (i.e., driving torque) generated during the driving of the vehicle can be limited by gear shifting and/or the brake. For example, the limitation of driving force by the gear shift can be requested by a transmission control unit (TCU), and the limitation of driving force by the brake can be requested by a brake control unit (BCU).

The TCU typically controls the transmission and prevents an excessive increase in engine speed or impact during the gear shift. The TCU can also request torque intervention for limiting the driving force to a hybrid control unit (HCU) which is a higher control unit for protecting the transmission and the like. The BCU, meanwhile, can control operation of the brake of the vehicle and can request torque intervention for limiting the driving force during the brake to the HCU. The HCU receives the request decreases and determines a torque of the engine and the motor based on a current torque.

In this case, the limitation of driving force requested by each control unit has a different purpose, but is the same in that the phenomena represented while driving is the torque decrease, and the respective control units are considerably similar in their functionality. However, technology for limiting driving force by the gear shift and technology for limiting driving force by the brake are separately developed according to the unit submitting the request (e.g., the TCU and the BCU). Consequently, resources such as time and money are wasted during the development process, and when duplicate requests for torque intervention are submitted by the gear shift and the brake, unintended results occur, including a poor response, deterioration of operation performance, and the like.

Therefore, in a case of a road surface during the winter season, covered in snow, ice, or the like, the limitation of driving force by the brake can be generated for a relatively long time, while an event for the gear shift is frequently generated during the limitation of the driving force by the brake. However, when a priority is given to the torque intervention by the brake, and the torque intervention by the gear shift is ignored, acceleration of the vehicle deteriorates due to a gear shift delay.

The above information disclosed in this Background section is only for enhancement of understanding of the background of the disclosure. Therefore, it may contain information that does not form the related art that is already known to a person of ordinary skill in the art.

SUMMARY OF THE DISCLOSURE

The present disclosure has been made in an effort to solve the above-described problems associated with the related art.

An object of the present disclosure is to provide a system and a method for controlling torque intervention of a hybrid electric vehicle, which allow torque intervention by a gear shift and torque intervention by a brake. That is, torque intervention performed during the gear shift and torque intervention performed during the brake can be combined into one, so that when a limitation of driving force is requested during the driving of the vehicle, torque intervention having a separate purpose is allowed to be duplicately performed, thereby improving driving performance.

According to embodiments of the present disclosure, a method of controlling torque intervention of a hybrid electric vehicle includes: receiving at least one torque intervention request; determining, by a control unit, a gear shift intervention requested quantity requested for limiting a driving torque of the vehicle during a gear shift and a brake intervention requested quantity requested for limiting the driving torque of the vehicle during a braking operation in response to receiving the at least one torque intervention request; generating, by the control unit, a combined intervention requested quantity based on the gear shift intervention requested quantity and the brake intervention requested quantity; and determining, by the control unit, a type of current intervention based on the combined intervention requested quantity.

The determining of the gear shift intervention requested quantity and the brake intervention requested quantity may include: comparing, by the control unit, the gear shift intervention requested quantity with the brake intervention requested quantity; and setting, by the control unit, the combined intervention requested quantity as equal to the smaller of the gear shift intervention requested quantity and the brake intervention requested quantity.

The determining of the type of current intervention may include: comparing, by the control unit, the gear shift intervention requested quantity and the brake intervention requested quantity; determining, by the control unit, the smaller of the gear shift intervention requested quantity and the brake intervention requested quantity; and determining, by the control unit, the type of current intervention based on a request subject which requests a torque intervention corresponding to the smaller of the gear shift intervention requested quantity and the brake intervention requested quantity.

The method may further include: calculating, by the control unit, a motor basic intervention quantity and an engine basic intervention quantity based on the combined intervention requested quantity; generating, by the control unit, an intervention decrease weighted value according to the type of current intervention; calculating, by the control unit, an intervention adjustment quantity based on the intervention decrease weighted value; and generating, by the control unit, a motor final intervention quantity and an engine final intervention quantity based on the motor basic intervention quantity, the engine basic intervention quantity, and the intervention adjustment quantity.

The calculating of the motor basic intervention quantity and the engine basic intervention quantity may include: calculating, by the control unit, a driving torque decrease requested quantity according to the combined intervention requested quantity; calculating, by the control unit, a basic motor torque decrease quantity including a part of the driving torque decrease requested quantity; calculating, by the control unit, a value corresponding to a sum of the basic motor torque decrease quantity and a motor torque before receiving the at least one torque intervention request; and setting, by the control unit, the motor basic intervention quantity as equal to the calculated value.

The method may further include calculating, by the control unit, the basic motor torque decrease quantity by multiplying a level of contribution of the motor torque to the driving torque before receiving the at least one torque intervention request with the driving torque decrease requested quantity.

The calculating of the intervention adjustment quantity may include: selecting, by the control unit, a gear shift intervention decrease weighted value or a brake intervention decrease weighted value as an intervention decrease weighted value according to the type of current intervention; calculating, by the control unit, a value by subtracting a motor torque before receiving the at least one torque intervention request from a motor charging limited torque; comparing, by the control unit, the calculated value with a driving torque decrease requested quantity; determining, by the control unit, the larger of the calculated value and the driving torque decrease requested quantity; and calculating, by the control unit, the intervention adjustment quantity by multiplying the intervention decrease weighted value with the larger of the calculated value and the driving torque decrease requested quantity.

The generating of the motor final intervention quantity and the engine final intervention quantity may include calculating, by the control unit, the motor final intervention quantity by adding the motor basic intervention quantity and the intervention adjustment quantity.

Furthermore, in accordance with embodiments of the present disclosure, a system for controlling torque intervention of a hybrid electric vehicle includes: a memory configured to store program instructions; and a control unit configured to execute the stored program instructions, wherein when the program instructions are executed, the control unit is configured to: i) determine a gear shift intervention requested quantity requested for limiting a driving torque of the vehicle during a gear shift and a brake intervention requested quantity requested for limiting the driving torque of the vehicle during a braking operation in response to receiving at least one torque intervention request; ii) generate a combined intervention requested quantity based on the gear shift intervention requested quantity and the brake intervention requested quantity; and iii) determine a type of current intervention based on the combined intervention requested quantity.

Accordingly, it is possible to effectively respond to a situation in which torque intervention is duplicately requested by a gear shift control unit (TCU) requesting the limitation of the driving force (i.e., driving torque) by the gear shift and the brake control unit (BCU) requesting the limitation of the driving force by the brake in real-time. This can be achieved by combining and controlling torque intervention performed during the gear shift and torque intervention performed during the brake.

Other aspects and embodiments of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

Figure 1:
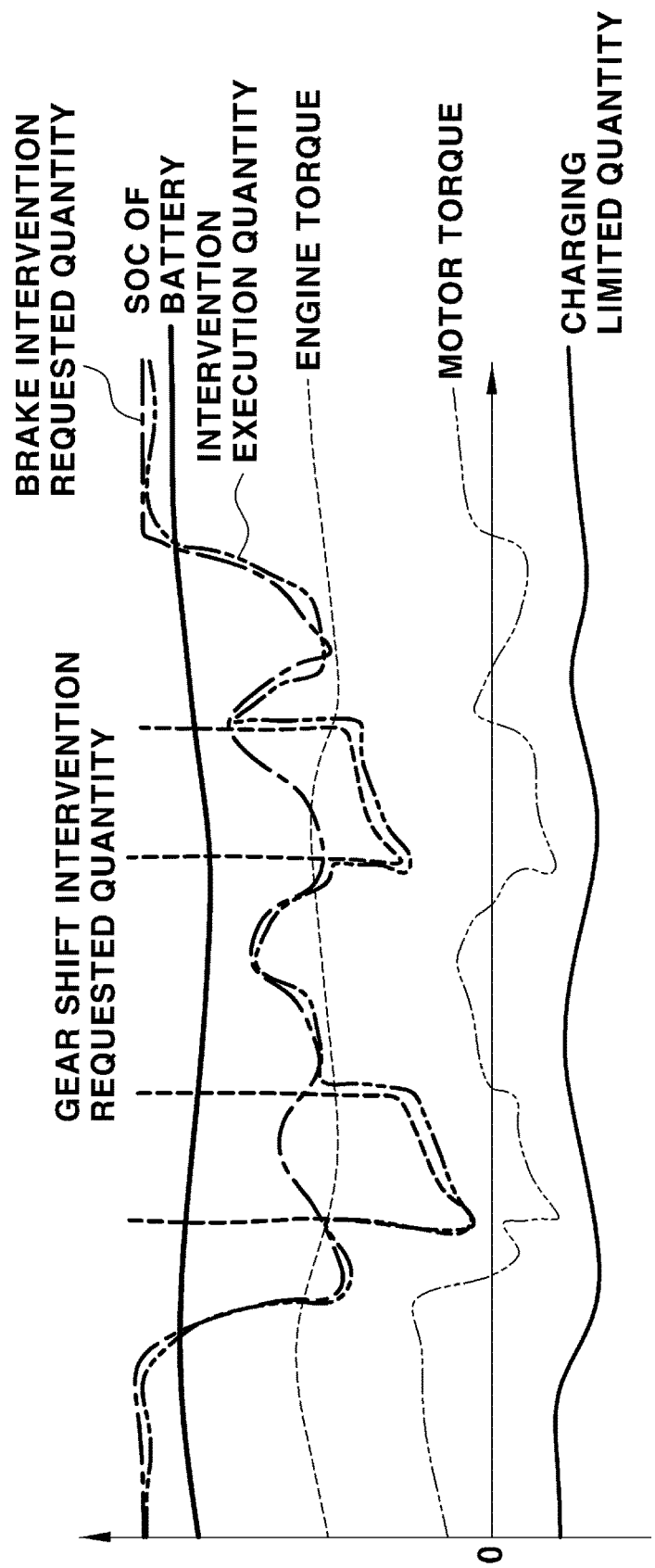
FIG. 1 is a concept diagram schematically illustrating a method for controlling torque intervention of a hybrid electric vehicle according to embodiments of the present disclosure.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION OF THE EMBODIMENTS

Hereinafter reference will now be made in detail to various embodiments of the present disclosure, examples of which are illustrated in the accompanying drawings and described below. While the invention will be described in conjunction with embodiments, it will be understood that the present description is not intended to limit the scope of the disclosure to those embodiments. On the contrary, the scope of the disclosure is intended to cover not only the embodiments described herein, but also various alternatives, modifications, equivalents and other embodiments, which may be included within the spirit and scope of the disclosure as defined by the appended claims.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one control unit. The term "control unit" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the control unit in conjunction with one or more other components, as would be appreciated by a person of ordinary skill in the art.

Furthermore, the control unit of the present disclosure may be embodied as non-transitory computer readable media containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

Hereinafter, the present disclosure will be described so that those skilled in the art may easily implement the present disclosure.

The hybrid electric vehicle according to the present disclosure is equipped with a hybrid control unit (HCU) that is a higher control unit of the hybrid electric vehicle, an engine control unit controlling an engine torque according to a torque command ordered from the higher control unit, a motor control unit controlling a motor torque according to a torque command ordered from the higher control unit, a transmission control unit (TCU) for performing a gear shift-related control, and a brake control unit (BCU) for performing a brake-related control, as hardware configurations for controlling a torque of the vehicle.

When an input torque of the transmission, which is input from the engine and/or a motor to an input shaft of the transmission, is not appropriately decreased in a gear shift required situation (particularly, a gear shifting up), an output torque of the transmission may be changed due to an impact by a connection or a separation of a clutch during the brake and the gear shift, and thus a driver senses a difference in the gear shift or a gear shift impact.

In order to decrease the sense of difference in the gear shift or the gear shift impact generated in this case, the TCU and the BCU request torque intervention of momentarily decreasing the input torque of the transmission to the HCU, and the HCU transmits an engine torque, which is decreased and determined according to the request of each control unit, and a motor torque command to the engine control unit and the motor control unit.

The TCU requests the torque intervention, that is, the gear shift intervention, for the torque decrease of momentarily decreasing the input torque of the transmission during the gear shift, and the BCU requests the torque intervention, that is, the brake intervention, for the torque decrease of momentarily decreasing the input torque of the transmission during the brake.

When the gear shift intervention is performed, a driving torque (motor torque+engine torque) follows a target driving torque according to a gear shift intervention requested quantity required by the TCU to the HCU, aims a battery charging for securing fuel efficiency to secure a state of charge (SOC) of the battery, and improves a response by responding to a situation with the motor at a response speed as high as possible.

When the brake intervention is performed, a driving torque (motor torque+engine torque) follows a target driving torque according to a brake intervention requested quantity required by the BCU to the HCU, and performs a battery SOC balancing for responding to the generation of the limitation of the driving force for a long time, and securing the probability in using the motor.

The gear shift intervention and the brake intervention have the same characteristic in that the driving force is basically controlled to be decreased, but the gear shift intervention needs to be selectively performed in an aspect of the aim to charge the battery for securing fuel efficiency and of the requirement of the response speed as high as possible, and the brake intervention needs to be selectively performed in an aspect of the possibility of the long-time generation.

According to the present disclosure, the HCU may be established with a combined intervention requested quantity determining unit, which determines any one of a gear shift intervention requested quantity requested for limiting a driving torque during the gear shift and a brake intervention requested quantity requested for limiting a driving torque during the brake when the torque intervention is requested for decreasing the driving torque of the vehicle as a combined intervention requested quantity, an intervention type determining unit, which determines a combined intervention request subject and a current intervention type based on the gear shift intervention requested quantity and the brake intervention requested quantity, a basic intervention quantity determining unit, which determines a motor basic intervention quantity and an engine basic intervention quantity based on the determined combined intervention requested quantity, an intervention adjustment quantity determining unit, which determines an intervention adjustment quantity based on an intervention decrease weighted value set according to the combined intervention request subject and the type of current intervention, and a final intervention quantity determining unit, which determines a motor final intervention quantity and an engine final intervention quantity based on the determined motor basic intervention quantity, engine basic intervention quantity, and intervention adjustment quantity.

In the present disclosure, a combined intervention, in which the torque intervention (i.e., the gear shift intervention) requested during the gear shift is combined with the torque intervention (i.e., the brake intervention) requested during the brake, may also be implemented based on the HCU established as described above.

Figure 2:
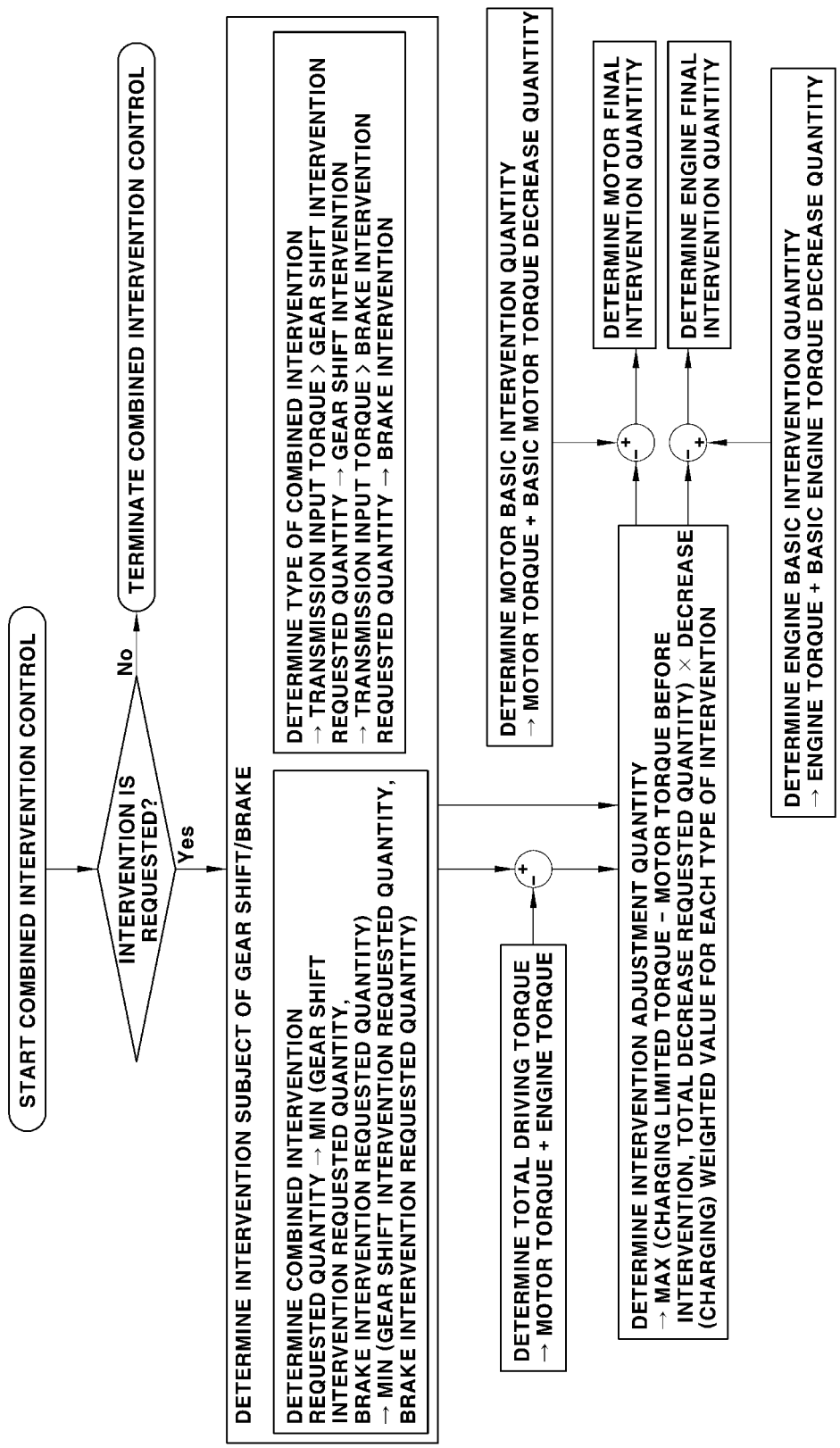
FIG. 2 is a diagram for describing the method for controlling torque intervention of the hybrid electric vehicle according to embodiments the present disclosure.

FIG. 1 is a concept diagram schematically illustrating a method for controlling torque intervention of a hybrid electric vehicle according to embodiments of the present disclosure; and FIG. 2 is a diagram for describing the method for controlling torque intervention of the hybrid electric vehicle according to embodiments of the present disclosure.

First, when torque intervention is requested for limiting and decreasing driving torque of a vehicle, the combined intervention requested quantity determining unit determines any one of a gear shift intervention requested quantity of a TCU and a brake intervention requested quantity of a BCU as a combined intervention requested quantity.

When a gear shift intervention requested quantity for limiting a driving torque during the gear shift and/or a brake intervention requested quantity for limiting a driving torque during the brake are input, the combined intervention requested quantity determining unit recognizes that the torque intervention is requested, and determines a combined intervention requested quantity according to the gear shift intervention requested quantity and the brake intervention requested quantity.

The combined intervention requested quantity is a kind of target driving torque given by a request subject requesting the torque intervention of the driving torque, and may be regarded as a target which the driving torque reaches by decreasing the driving torque through an intervention control, and is determined with a smaller value between the gear shift intervention requested quantity and the brake intervention requested quantity. That is, the combined intervention requested quantity is determined based on the intervention requested quantity of the request subject demanding the decrease of the larger amount of driving torque.

Next, the intervention type determining unit determines the type of current intervention based on the gear shift intervention requested quantity of the TCU and the brake intervention requested quantity of the BCU. Particularly, the intervention type determining unit compares the gear shift intervention requested quantity and the brake intervention requested quantity with a transmission input torque, and determines a control unit, which transmits the intervention requested quantity having a smaller value than that of the transmission input torque to the HCU as the combined intervention request subject.

The reason is that any one intervention requested quantity transmitted by the control unit requesting the current torque intervention has a smaller value than that of the transmission input torque, and the other intervention requested quantity has the larger value than that of the transmission input torque.

Accordingly, the control unit, which transmits the torque intervention quantity having the smaller value (i.e., the intervention requested quantity having a larger difference between the current torque quantity and the requested torque quantity) between the gear shift intervention requested quantity or the brake intervention requested quantity transmitted to the HCU for the combined intervention control, becomes the request subject during the performance of the combined intervention, and in this case, the type of current intervention is determined according to the combined intervention request subject.

That is, the control unit requesting the relatively smaller value between the gear shift intervention requested quantity and the brake intervention requested quantity becomes the subject of the combined intervention request, and particularly, when the gear shift intervention requested quantity has a smaller value than that of the brake intervention requested quantity, the TCU is the subject of the combined intervention request and the gear shift intervention is the type of current intervention, and when the brake intervention requested quantity has a smaller value than that of the gear shift intervention requested quantity, the BCU is the subject of the combined intervention request and the brake intervention is the type of current intervention.

Next, the basic intervention quantity determining unit determines a motor basic intervention quantity (or an intervention execution quantity) and an engine basic intervention quantity (or an intervention execution quantity) based on the determined combined intervention requested quantity.

The motor basic intervention quantity is determined with a value obtained by adding a basic motor torque decrease quantity and a motor torque before the torque intervention request, and the basic motor torque decrease quantity is determined with a part of a driving torque decrease requested quantity according to a level of contribution of the motor torque to the driving torque before the torque intervention request.

$$\text{Motor basic intervention quantity} = \text{Basic motor torque decrease quantity} + \text{Motor torque before torque intervention request} \quad [\text{Equation 1}]$$

$$\text{Basic motor torque decrease quantity} = \text{Level of contribution of motor torque to driving torque before torque intervention request} \times \text{Driving torque decrease requested quantity} \quad [\text{Equation 2}]$$

Accordingly, the basic motor torque decrease quantity is determined with a value calculated by multiplying a level of contribution of the motor torque to the driving torque and the driving torque decrease requested quantity.

The engine basic intervention quantity is determined with a value obtained by adding a basic engine torque decrease quantity and an engine torque before the torque intervention request, and the basic engine torque decrease quantity is determined with a part of a driving torque decrease requested quantity according to a level of contribution of the engine torque to the driving torque before the torque intervention request.

$$\text{Engine basic intervention quantity} = \text{Basic engine torque decrease quantity} + \text{Engine torque before torque intervention requst} \quad [\text{Equation 3}]$$

$$\text{Basic engine torque decrease quantity} = \text{Level of contribution of engine torque to driving torque before torque intervention request} \times \text{Driving torque decrease requested quantity} \quad [\text{Equation 4}]$$

Accordingly, the basic engine torque decrease quantity is determined with a value calculated by multiplying a level of contribution of the engine torque to the driving torque and the driving torque decrease requested quantity.

Here, the driving torque decrease requested quantity is determined by a difference value between the combined intervention requested quantity and the driving torque (motor torque+engine torque).

$$\text{Driving torque decrease requested quantity} = \text{Driving torque} - \text{Combined intervention requested quantity} \quad [\text{Equation 5}]$$

The basic motor torque decrease quantity and the basic engine torque decrease quantity may be determined by other publicly known technologies.

Next, the intervention adjustment quantity determining unit selects and determines any one of intervention decrease weighted values set according to the request subject requesting the torque intervention, and determines an intervention adjustment quantity based on the determined intervention decrease weighted value.

A gear shift intervention decrease weighted value is pre-set as an intervention decrease weighted value in a case where the TCU requests the torque intervention by transmitting the gear shift intervention requested quantity to the HCU, that is, the intervention decrease weighted value during the performance of the gear shift intervention, and a brake intervention decrease weighted value is pre-set as an intervention decrease weighted value in a case where the BCU requests the torque intervention by transmitting the brake intervention requested quantity to the HCU, that is, the intervention decrease weighted value during the performance of the brake intervention.

When the TCU is determined as the request subject of the combined intervention, i.e., the type of currently performed intervention is the gear shift intervention, the intervention adjustment quantity determining unit selects and determines the set gear shift intervention decrease weighted value as the intervention decrease weighed value, and when the BCU is determined as the request subject of the combined intervention, i.e., the type of currently performed intervention is the brake intervention, the intervention adjustment quantity determining unit selects and determines the set brake intervention decrease weighted value as the intervention decrease weighed value.

To this end, the intervention adjustment quantity determining unit compares the gear shift intervention requested quantity and the brake intervention requested quantity with the transmission input torque, and determines the control unit, which transmits the intervention requested quantity having a smaller value than that of the transmission input torque to the HCU, as the request subject of the combined intervention.

The reason is that only one intervention requested quantity transmitted by the control unit currently requesting the torque intervention has a smaller value than that of the transmission input torque, and the other has a larger value than that of the transmission input torque. That is, the intervention adjustment quantity determining unit determines the intervention adjustment quantity based on the intervention decrease weighted value determined according to the type of current intervention.

Particularly, the intervention adjustment quantity determining unit selects and determines any one of the gear shift intervention decrease weighted value and the brake intervention decrease weighted value according to the type of current intervention as the intervention decrease weighted value, and compares a value obtained by subtracting the motor torque before the request of the intervention from a motor charging limited torque with the driving torque decrease requested quantity, and determines a larger value. The intervention adjustment quantity is calculated by multiplying the determined larger value and the intervention decrease weighted value.

A battery charging weight according to the torque intervention when the TCU is the intervention requesting subject and when the BCU is the intervention requesting subject is adjusted by the determined intervention adjustment quantity. That is, the battery charging weight according to the torque intervention when the type of current intervention is the gear shift intervention and when the type of intervention is the brake intervention is adjusted by the intervention adjustment quantity.

The motor charging limited torque is a limited charging torque value of the motor used for charging a battery mounted in the vehicle, and is determined in consideration of an SOC of the battery and performance of the motor.

Next, the final intervention quantity determining unit determines a motor final intervention quantity (or an intervention execution quantity) and an engine final intervention quantity (or an intervention execution quantity) based on the motor basic intervention quantity and the engine basic intervention quantity determined by the basic intervention determining unit and the intervention adjustment quantity determined by the intervention adjustment quantity determining unit.

The motor final intervention quantity is determined by adding the motor basic intervention quantity and the intervention adjustment quantity, and the engine final intervention quantity is determined by a value obtained by subtracting the intervention adjustment quantity from the engine basic intervention quantity.

The torque intervention control is performed based on the motor final intervention quantity and the engine final intervention quantity determined by the final intervention quantity determining unit. That is, the HCU transmits the motor torque command and the engine torque command determined based on the determined motor final intervention quantity and engine final intervention quantity to the motor control unit and the engine control unit, respectively, so that the torque decrease control by the combined intervention is performed.

As described above, it is possible to effectively respond to a situation, in which the torque intervention is duplicately requested by the TCU and the BCU in real-time by combining and controlling the torque intervention (i.e., the brake intervention) performed for limiting the driving torque (i.e., driving force) during the braking of the vehicle and the torque intervention (i.e., the gear shift intervention) performed for limiting the driving torque during the gear shift.

It will be appreciated by those skilled in the art that the present disclosure as described above may be implemented into other specific forms without departing from the technical spirit thereof or essential characteristics. Thus, it is to be appreciated that embodiments described above are intended to be illustrative in every sense, and not restrictive. The scope of the present disclosure is represented by the claims to be described below rather than the detailed description, and it is to be interpreted that the meaning and scope of the claims and all the changes or modified forms derived from the equivalents thereof come within the scope of the present disclosure.

What is claimed is:

1. A method of controlling torque intervention of a hybrid electric vehicle, the method comprising:
    receiving at least one torque intervention request;
    determining, by a control unit, a gear shift intervention requested quantity requested for limiting a driving torque of the vehicle during a gear shift and a brake intervention requested quantity requested for limiting the driving torque of the vehicle during a braking operation in response to receiving the at least one torque intervention request;
    generating, by the control unit, a combined intervention requested quantity based on the gear shift intervention requested quantity and the brake intervention requested quantity;
    determining, by the control unit, a type of current intervention based on the combined intervention requested quantity; and
    controlling, by the control unit, the hybrid electric vehicle based on the combined intervention requested quantity,
    wherein determining the gear shift intervention requested quantity and the brake intervention requested quantity further comprises:
        comparing, by the control unit, the gear shift intervention requested quantity with the brake intervention requested quantity; and
        setting, by the control unit, the combined intervention requested quantity as equal to the smaller of the gear shift intervention requested quantity and the brake intervention requested quantity.

2. The method of claim 1, further comprising:
calculating, by the control unit, a motor basic intervention quantity and an engine basic intervention quantity based on the combined intervention requested quantity;
calculating, by the control unit, an intervention adjustment quantity based on the intervention decrease weighted value; and
generating, by the control unit, a motor final intervention quantity and an engine final intervention quantity based on the motor basic intervention quantity, the engine basic intervention quantity, and the intervention adjustment quantity.

3. The method of claim 2, wherein the calculating of the motor basic intervention quantity and the engine basic intervention quantity comprises:
calculating, by the control unit, a driving torque decrease requested quantity according to the combined intervention requested quantity;
calculating, by the control unit, a basic motor torque decrease quantity including a part of the driving torque decrease requested quantity;
calculating, by the control unit, a value corresponding to a sum of the basic motor torque decrease quantity and a motor torque before receiving the at least one torque intervention request; and
setting, by the control unit, the motor basic intervention quantity as equal to the calculated value.

4. The method of claim 3, further comprising:
calculating, by the control unit, the basic motor torque decrease quantity by multiplying a level of contribution of the motor torque to the driving torque before receiving the at least one torque intervention request with the driving torque decrease requested quantity.

5. The method of claim 3, wherein the driving torque decrease requested quantity is a difference between the combined intervention requested quantity and the driving torque before receiving the at least one torque intervention request.

6. The method of claim 2, wherein the calculating of the motor basic intervention quantity and the engine basic intervention quantity comprises:
calculating, by the control unit, a driving torque decrease requested quantity according to the combined intervention requested quantity;
calculating, by the control unit, a basic engine torque decrease quantity including a part of the driving torque decrease requested quantity;
calculating, by the control unit, a value corresponding to a sum of the basic motor torque decrease quantity and an engine torque before receiving the at least one torque intervention request; and
setting, by the control unit, the engine basic intervention quantity as equal to the calculated.

7. The method of claim 6, further comprising:
calculating, by the control unit, the basic engine torque decrease quantity by multiplying a level of contribution of the engine torque to the driving torque before receiving the at least one torque intervention request with the driving torque decrease requested quantity.

8. The method of claim 6, wherein the driving torque decrease requested quantity is a difference between the combined intervention requested quantity and the driving torque before receiving the at least one torque intervention request.

9. The method of claim 2, wherein the calculating of the intervention adjustment quantity comprises:
selecting, by the control unit, a gear shift intervention decrease weighted value or a brake intervention decrease weighted value as an intervention decrease weighted value according to the type of current intervention;
calculating, by the control unit, a value by subtracting a motor torque before receiving the at least one torque intervention request from a motor charging limited torque;
comparing, by the control unit, the calculated value with a driving torque decrease requested quantity;
determining, by the control unit, the larger of the calculated value and the driving torque decrease requested quantity; and
calculating, by the control unit, the intervention adjustment quantity by multiplying the intervention decrease weighted value with the larger of the calculated value and the driving torque decrease requested quantity.

10. The method of claim 2, wherein the generating of the motor final intervention quantity and the engine final intervention quantity comprises:
calculating, by the control unit, the motor final intervention quantity by adding the motor basic intervention quantity and the intervention adjustment quantity.

11. The method of claim 2, wherein the generating of the motor final intervention quantity and the engine final intervention quantity comprises:
calculating, by the control unit, the engine final intervention quantity by subtracting the intervention adjustment quantity from the engine basic intervention quantity.

12. The method of claim 1, wherein the determining of the type of current intervention comprises:
comparing, by the control unit, the gear shift intervention requested quantity and the brake intervention requested quantity;
determining, by the control unit, the smaller of the gear shift intervention requested quantity and the brake intervention requested quantity; and
determining, by the control unit, the type of current intervention based on a request subject which requests the torque intervention corresponding to the smaller of the gear shift intervention requested quantity and the brake intervention requested quantity.

13. A system for controlling torque intervention of a hybrid electric vehicle, the system comprising:
a memory configured to store program instructions; and
a control unit configured to execute the stored program instructions,
wherein when the program instructions are executed, the control unit is configured to:
i) determine a gear shift intervention requested quantity requested for limiting a driving torque of the vehicle during a gear shift and a brake intervention requested quantity requested for limiting the driving torque of the vehicle during a braking operation in response to receiving at least one torque intervention request;
ii) generate a combined intervention requested quantity based on the gear shift intervention requested quantity and the brake intervention requested quantity; and
iii) determine a type of current intervention based on the combined intervention requested quantity,
wherein the control unit is further configured to:
control the hybrid electric vehicle based on the combined intervention requested quantity;

compare the gear shift intervention requested quantity with the brake intervention requested quantity; and set the combined intervention requested quantity as equal to the smaller of the gear shift intervention requested quantity and the brake intervention requested quantity.

14. The system of claim 13, wherein the control unit is further configured to:
calculate a motor basic intervention quantity and an engine basic intervention quantity based on the combined intervention requested quantity;
calculate an intervention adjustment quantity based on the intervention decrease weighted value; and
generate a motor final intervention quantity and an engine final intervention quantity based on the motor basic intervention quantity, the engine basic intervention quantity, and the intervention adjustment quantity.

15. The system of claim 14, wherein the control unit is further configured to:
calculate a driving torque decrease requested quantity according to the combined intervention requested quantity;
calculate a basic motor torque decrease quantity including a part of the driving torque decrease requested quantity;
calculate a value corresponding to a sum of the basic motor torque decrease quantity and a motor torque before receiving the at least one torque intervention request; and
set the motor basic intervention quantity as equal to the calculated value.

16. The system of claim 15, wherein the control unit is further configured to:
calculate the basic motor torque decrease quantity by multiplying a level of contribution of the motor torque to the driving torque before receiving the at least one torque intervention request with the driving torque decrease requested quantity.

17. The system of claim 15, wherein the driving torque decrease requested quantity is a difference between the combined intervention requested quantity and the driving torque before receiving the at least one torque intervention request.

18. The system of claim 14, wherein the control unit is further configured to:
calculate a driving torque decrease requested quantity according to the combined intervention requested quantity;
calculate a basic engine torque decrease quantity including a part of the driving torque decrease requested quantity;
calculate a value corresponding to a sum of the basic motor torque decrease quantity and an engine torque before receiving the at least one torque intervention request; and
set the engine basic intervention quantity as equal to the calculated.

19. The system of claim 18, wherein the control unit is further configured to:
calculate the basic engine torque decrease quantity by multiplying a level of contribution of the engine torque to the driving torque before receiving the at least one torque intervention request with the driving torque decrease requested quantity.

20. The system of claim 18, wherein the driving torque decrease requested quantity is a difference between the combined intervention requested quantity and the driving torque before receiving the at least one torque intervention request.

21. The system of claim 14, wherein the control unit is further configured to:
select a gear shift intervention decrease weighted value or a brake intervention decrease weighted value as an intervention decrease weighted value according to the type of current intervention;
calculate a value by subtracting a motor torque before receiving the at least one torque intervention request from a motor charging limited torque;
compare the calculated value with a driving torque decrease requested quantity;
determine the larger of the calculated value and the driving torque decrease requested quantity; and
calculate the intervention adjustment quantity by multiplying the intervention decrease weighted value with the larger of the calculated value and the driving torque decrease requested quantity.

22. The system of claim 14, wherein the control unit is further configured to calculate the motor final intervention quantity by adding the motor basic intervention quantity and the intervention adjustment quantity.

23. The system of claim 14, wherein the control unit is further configured to calculate the engine final intervention quantity by subtracting the intervention adjustment quantity from the engine basic intervention quantity.

24. The system of claim 13, wherein the control unit is further configured to:
compare the gear shift intervention requested quantity and the brake intervention requested quantity;
determine the smaller of the gear shift intervention requested quantity and the brake intervention requested quantity; and
determine the type of current intervention based on a request subject which requests the torque intervention corresponding to the smaller of the gear shift intervention requested quantity and the brake intervention requested quantity.

* * * * *